(12) United States Patent
Chao et al.

(10) Patent No.: US 7,656,584 B2
(45) Date of Patent: *Feb. 2, 2010

(54) COMPOSITE LENS STRUCTURE

(75) Inventors: Chih-Chiang Chao, Taipei (TW);
Po-Ling Shiao, Hsinchu (TW); Yu-Tsan Tseng, Taoyuan County (TW);
Cheng-Hsuan Lin, Changhua County (TW); Mei-Chun Lai, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

This patent is subject to a terminal disclaimer.

(21) Appl. No.: 11/843,590

(22) Filed: Aug. 22, 2007

(65) Prior Publication Data

US 2008/0304164 A1 Dec. 11, 2008

(30) Foreign Application Priority Data

Jun. 11, 2007 (TW) .............................. 96120946 A

(51) Int. Cl.
*G02B 27/10* (2006.01)
*G03B 21/60* (2006.01)
(52) U.S. Cl. ..................................... 359/625; 359/455
(58) Field of Classification Search ................. 359/455, 359/456, 599, 619, 620, 625, 707
See application file for complete search history.

(56) References Cited

U.S. PATENT DOCUMENTS

| 5,177,637 A | 1/1993 | Tsukada |
| 5,300,263 A | 4/1994 | Hoopman et al. |
| 5,861,990 A | 1/1999 | Tedesco |
| 6,445,504 B1 | 9/2002 | Suga et al. |
| 6,913,365 B2 | 7/2005 | Masaki et al. |
| 2003/0058553 A1* | 3/2003 | Epstein et al. .............. 359/831 |
| 2004/0061944 A1 | 4/2004 | Kashima et al. |
| 2005/0007793 A1 | 1/2005 | Yoshida et al. |
| 2006/0250707 A1 | 11/2006 | Whitney et al. |
| 2006/0256582 A1 | 11/2006 | Chuang |

FOREIGN PATENT DOCUMENTS

JP   2004126016 A   4/2004

\* cited by examiner

*Primary Examiner*—Alicia M Harrington
(74) *Attorney, Agent, or Firm*—Quintero Law Office

(57) ABSTRACT

A composite lens structure is disclosed. The composite lens structure includes a diffusion plate and an optical structure formed on the diffusion plate. The optical structure includes a plurality of convex portions arranged in a 2-D matrix along a first direction and a second direction and a plurality of concave portions arranged in a 2-D matrix also along the first direction and the second direction. Each convex portion adjacent to a plurality of concave portions includes a low curvature portion and a high curvature portion higher than the low curvature portion. Each concave portion adjacent to a plurality of convex portions includes a low curvature portion and a high curvature portion lower than the low curvature portion. The convex portions, the concave portions and each junction of the convex portion and the concave portion have a curvature different from 0.

43 Claims, 14 Drawing Sheets

COMPOSITE LENS STRUCTURE

BACKGROUND OF THE INVENTION

1. Field of the Invention

The invention relates to a composite lens structure, and in particular to a composite lens structure capable of focusing and diffusing light.

2. Description of the Related Art

Light emitting diodes, rather than CCFLs, are applied in backlight modules due to low cost and more simplified structure. A backlight module comprises optical films with various functional components, such as a light guide plate, a diffusion plate, a brightness enhancement film, and a dual brightness enhancement film. A composite optical film has two or more described functions, for example an optical structure is formed on a light guide plate to have light guide and light diffusion functions, or an optical structure is formed on a diffusion plate to have light diffusion and brightness enhancement functions. The brightness enhancement structure is a rhombus lens or the like, which is disclosed in U.S. Pat. No. 5,300,263. An optical structure with two micro structures alternatively arranged has the composite optical functions, which is disclosed in U.S. Pat. No. 5,177,637 or U.S. Pat. No. 5,861,990.

BRIEF SUMMARY OF INVENTION

An embodiment of a composite lens structure of the invention comprises a diffusion plate having a first surface and an optical structure formed on the first surface. The optical structure comprises a plurality of convex portions arranged in a two dimensional array along a first direction and a second direction, and a plurality of concave portions arranged in a two dimensional array along a first direction and a second direction. Each convex portion comprises a convex low curvature portion and a convex high curvature portion protruding from the convex low curvature portion, and the curvature radius of the convex high curvature portion is less than that of the convex low curvature portion. Each concave portion comprises a concave low curvature portion and a concave high curvature portion depressed from the concave low curvature portion, and the curvature radius of the concave high curvature portion is less than that of the concave low curvature portion. Each convex portion is adjacent to a plurality of concave portions and each concave portion is adjacent to a plurality of convex portions, and the convex portions, the concave portions and each junction of the convex and concave portions have a curvature different from 0.

The convex low curvature portion comprises a first low curvature portion along the first direction and a second low curvature portion along the second direction. The first low curvature portion and the second low curvature portion are connected to the convex high curvature portion. The first low curvature portion and the second low curvature portion have the same or different curvature.

The concave low curvature portion comprises a third low curvature portion along the first direction and a fourth low curvature portion along the second direction. The third low curvature portion and the fourth low curvature portion are connected to the concave high curvature portion. The third low curvature portion and the fourth low curvature portion have the same or different curvature.

The first low curvature portion is adjacent to the fourth low curvature portion, and the second low curvature portion is adjacent to the third low curvature portion.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The invention discloses a two-dimensional composite lens structure for two-dimensional light diffusion. The composite lens structure of the invention is formed by a laser dragging method.

Figure 1:
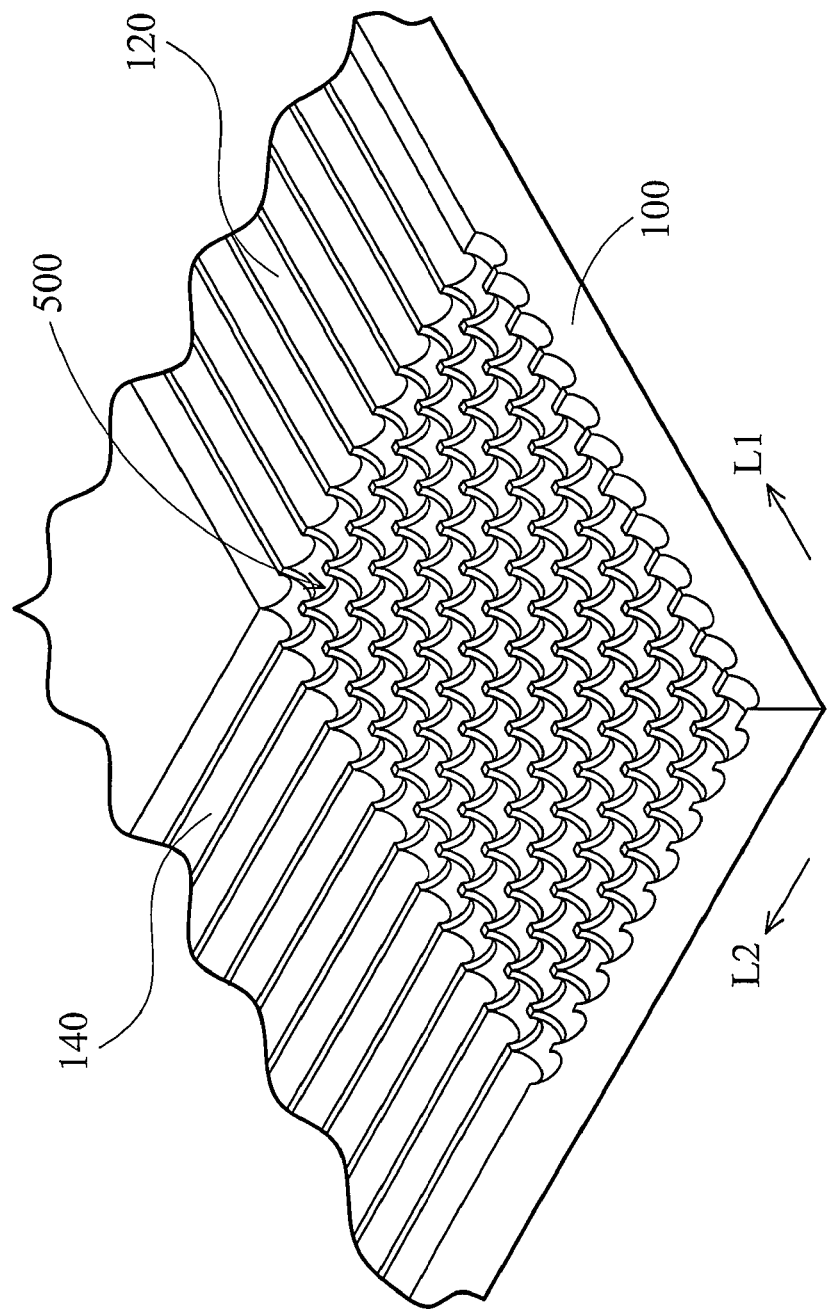
FIG. 1 is a schematic view of a method of forming a composite lens structure of the invention.

Referring to FIG. 1, a mask (not shown) is moved along a first direction L1, and laser beams pass through the mask to form a plurality of first grooves 120 on a substrate S. The mask is moved along a second direction L2 with laser beams passing therethrough to form a plurality of second grooves 140 on the substrate S. The first grooves 120 and the second grooves 140 constitute a composite lens structure 500 similar to stationary waves.

If the laser dragging is performed twice along the first direction L1 or the second direction L2 with different laser frequencies, intensities (first energy beam, second energy beam), and dragging speeds, then a structure with two different depths is non-symmetrically formed. The structure of the first depth has high curvature (small curvature radius). The structure of the second depth has low curvature (large curvature radius). Since the structure has high and low curvatures, it is possible to perform light focusing and light diffusion in the same structure. As the structure is non-symmetrical, light pattern can be non-uniform, whereby the composite lens structure can be used to adjust intensity distribution.

Figure 2:
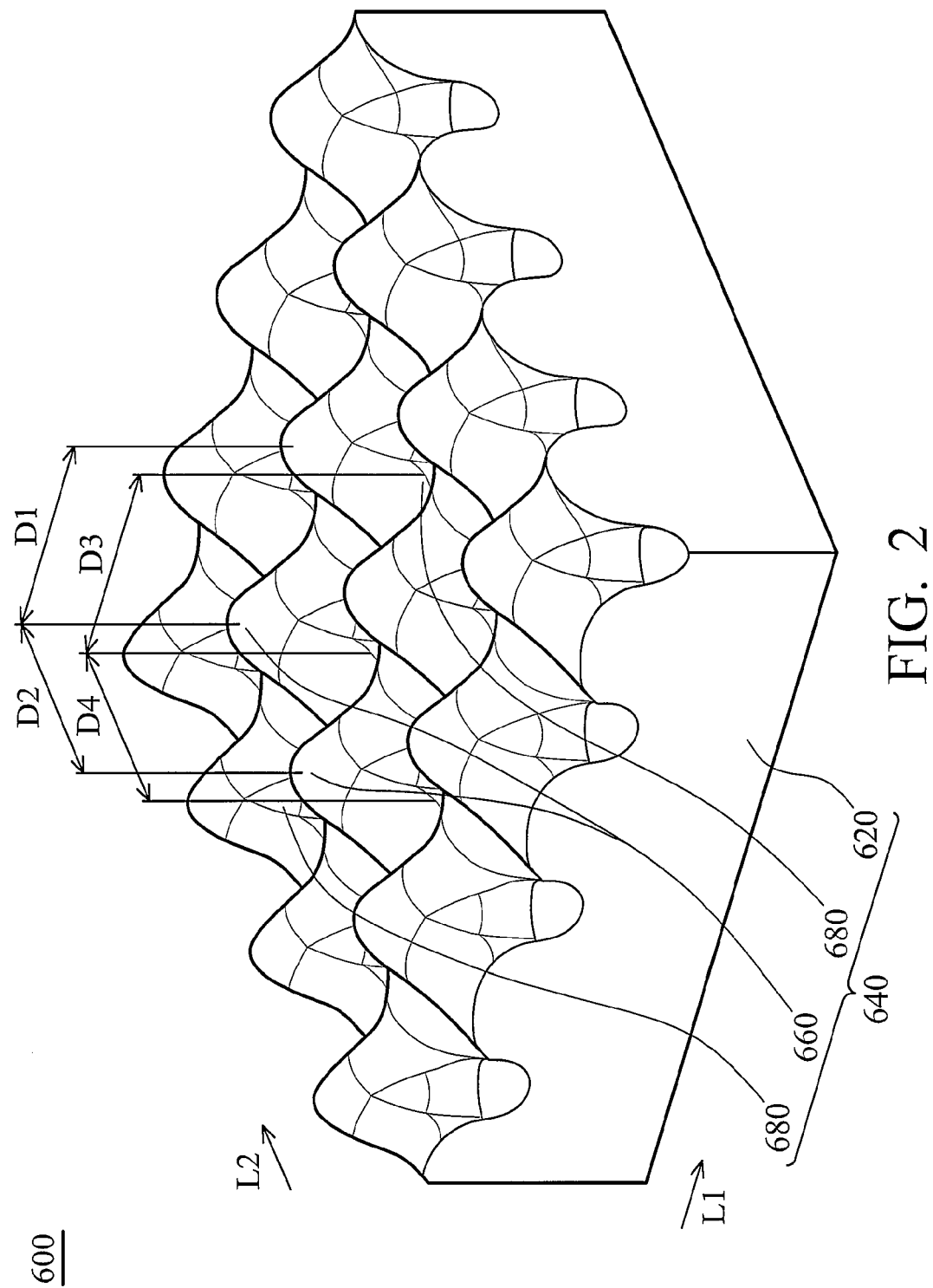
FIG. 2 is a schematic view of an embodiment of a composite lens structure of the invention.

FIG. 2 depicts an optical diffusion module 600 formed by laser dragging shown in FIG. 1. Referring to FIG. 2, the composite lens structure 600 comprises a diffusion plate 620 and an optical structure 640 formed on the diffusion plate 620.

The optical structure 640 comprises a plurality of convex portions 660 and a plurality of concave portions 680. The convex portions 660 are arranged in a two-dimensional array along the first and second directions. Similarly, the concave portions 680 are arranged in a two-dimensional array along the first and second directions. The convex portions 660 and the concave portions 690 are arranged alternating to form a pattern similar to stationary waves. In this embodiment, each convex portion 660 is adjacent to four concave portions 680, and each concave portion 680 is also adjacent to four convex portions 660. The mask is designed in such a manner that curvatures at the convex portions 660, the concave portions 680 and each junction of the convex portion 660 and concave portion 680 are different from 0. Along the first direction L1, the distance between two adjacent convex portions 660 is D1, and the distance between two adjacent concave portions 680 is D3. Along the second direction L2, the distance between two adjacent convex portions 660 is D2, and the distance between two adjacent concave portions 680 is D4.

Figure 3:
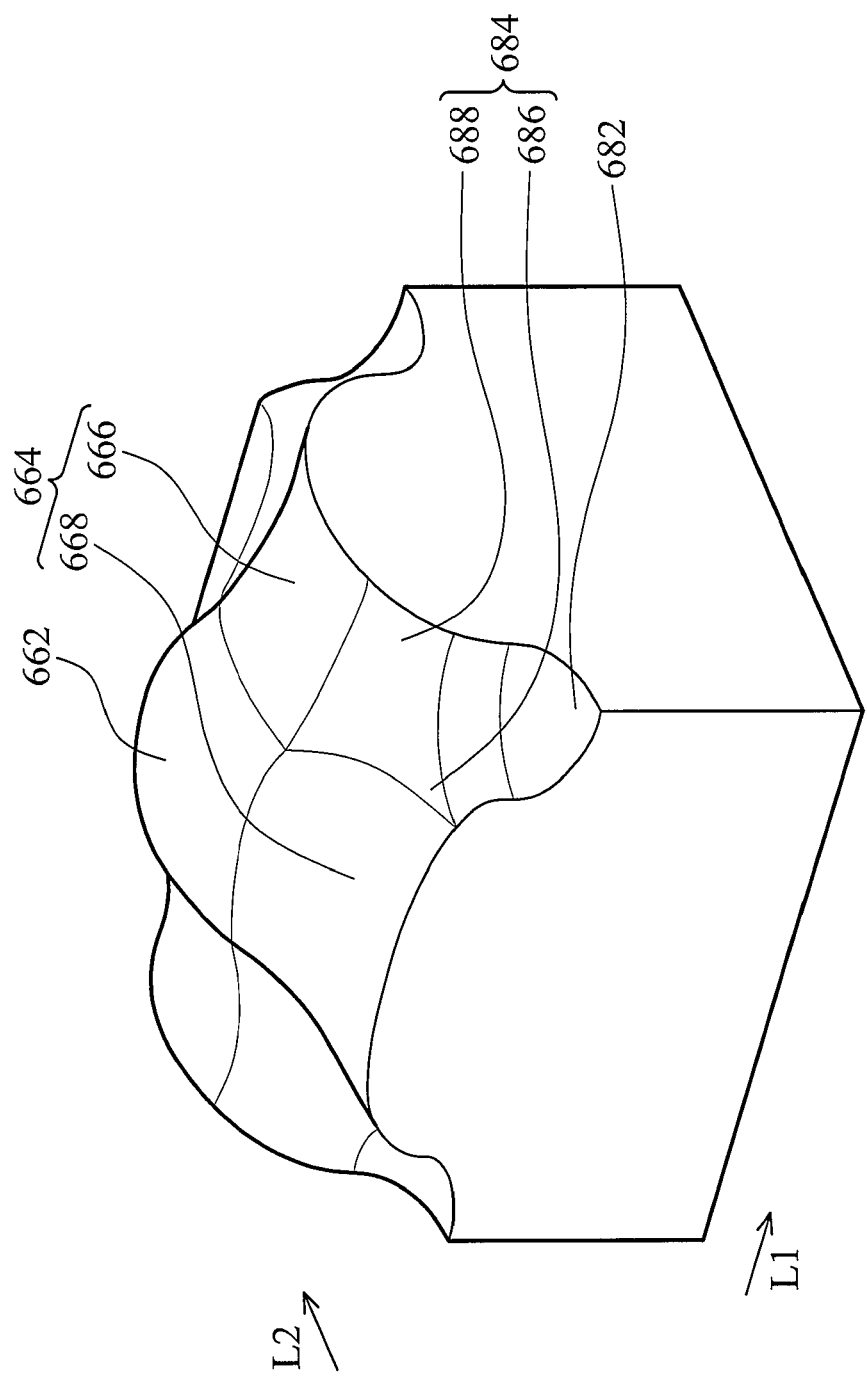
FIG. 3 is an enlarged view of the convex portion and the concave portion of the composite lens structure of FIG. 2.

FIG. 3 depicts an enlarged convex portion 660 and an enlarged concave portion 680. Referring to FIG. 3, a convex portion 660 comprises a convex high curvature portion 662 and a convex low curvature portion 664. The convex high curvature portion 662 protrudes from the convex low curvature portion 664 and is higher than the convex low curvature portion 664. The convex low curvature portion 664 comprises a first low curvature portion 666 extending along the first direction L1 and a second low curvature portion 668 extending along the second direction L2. The first low curvature portion 666 and the second low curvature portion 668 are adjacent to the convex high curvature portion 662.

Similarly, the concave portion 680 comprises a concave high curvature portion 682 and a concave low curvature portion 684. The concave high curvature portion 682 is depressed from the concave low curvature portion 684 and has larger depth than the concave low curvature portion 684. The concave low curvature portion 684 comprises a third low curvature portion 686 extending along the first direction L1 and a fourth low curvature portion 688 extending along the second direction L2. The third low curvature portion 686 and the fourth low curvature portion 688 are adjacent to the concave high curvature portion 682. Since the third low curvature portion 686 extends along the first direction L1, it is adjacent to the second low curvature portion 668 extending along the second direction L2. Similarly, since the fourth low curvature 688 extends along the second direction L2, it is adjacent to the first low curvature portion 666 extending along the first direction L1. The junction at the third low curvature portion 686 and the second low curvature portion 668 has a curvature different from 0. The junction at the fourth low curvature 688 and the first low curvature portion 666 also has a curvature different from 0.

The convex high curvature portion 662 and the concave high curvature portion 682 can condense light beam, and the first, second, third and fourth low curvature portion 666, 668, 686 and 688 can diffuse light. The first low curvature portion 666 and the second low curvature portion 668 have the same or different curvature radius. Similarly, the third low curvature portion 686 and the fourth low curvature portion 688 have the same or different curvature radius. The light is symmetrically diffused when the first low curvature portion 666 and the second low curvature portion 668 have the same curvature radius. The light is non-symmetrically diffused when the first low curvature portion 666 and the second low curvature portion 668 have different curvature radiuses, and when the third low curvature portions 686 and the fourth low curvature portion 688 have different curvature radiuses.

Figure 4:
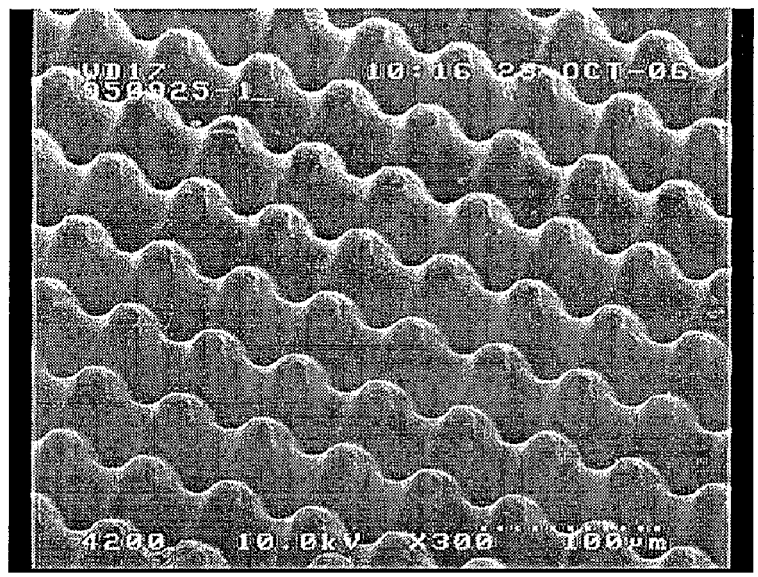
FIG. 4 is SEM diagram of a composite lens structure formed on PC.
Figure 5:
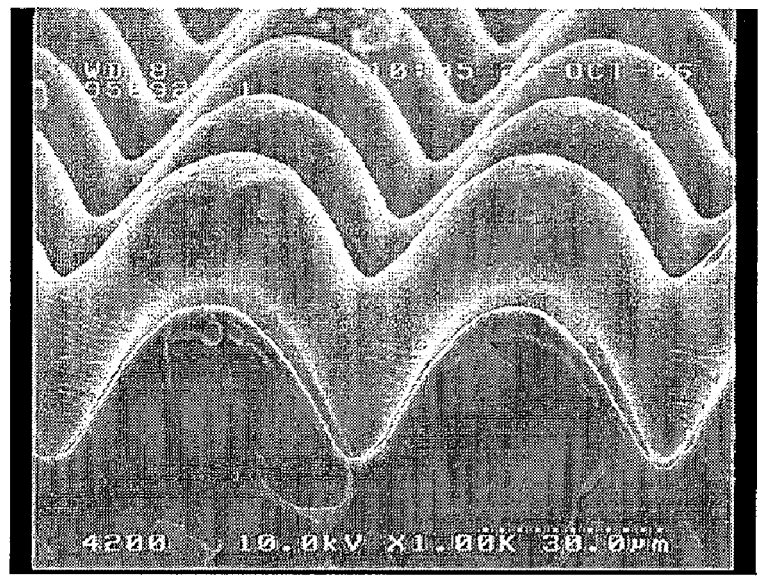
FIG. 5 is a cross section of the composite lens structure.
Figure 6:
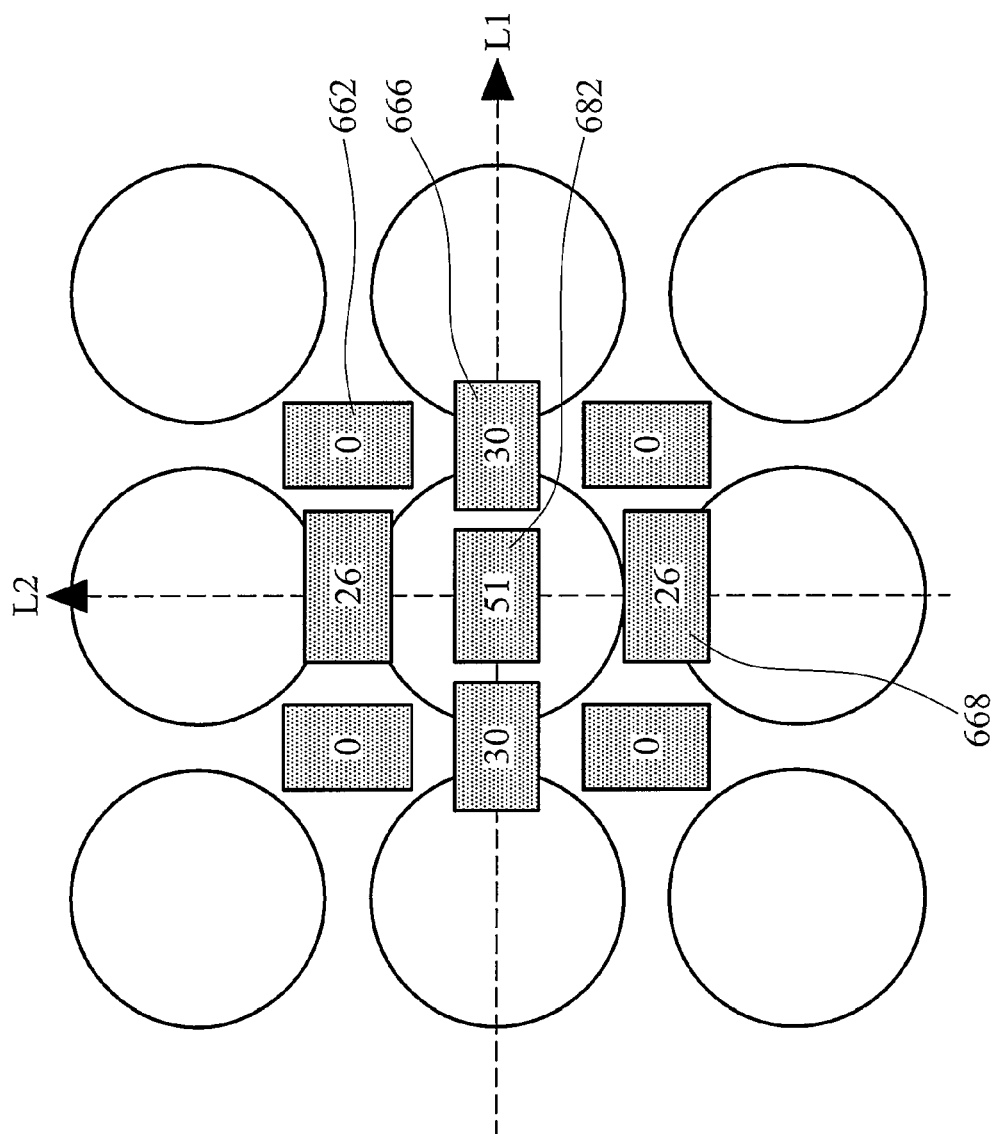
FIG. 6 depicts a composite lens unit.
Figure 7:
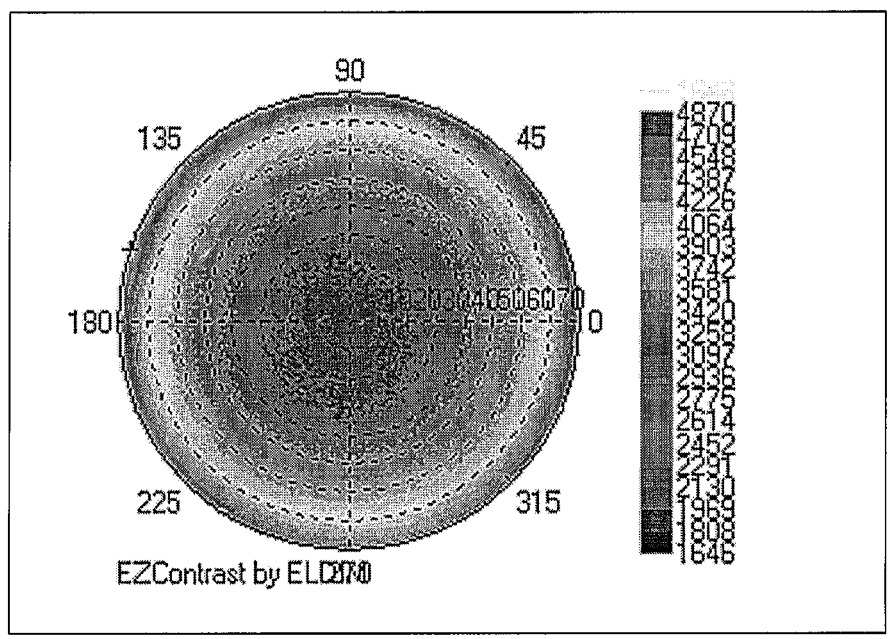
FIG. 7 is an intensity diagram of a conventional composite lens structure under ELDIM test.
Figure 8:
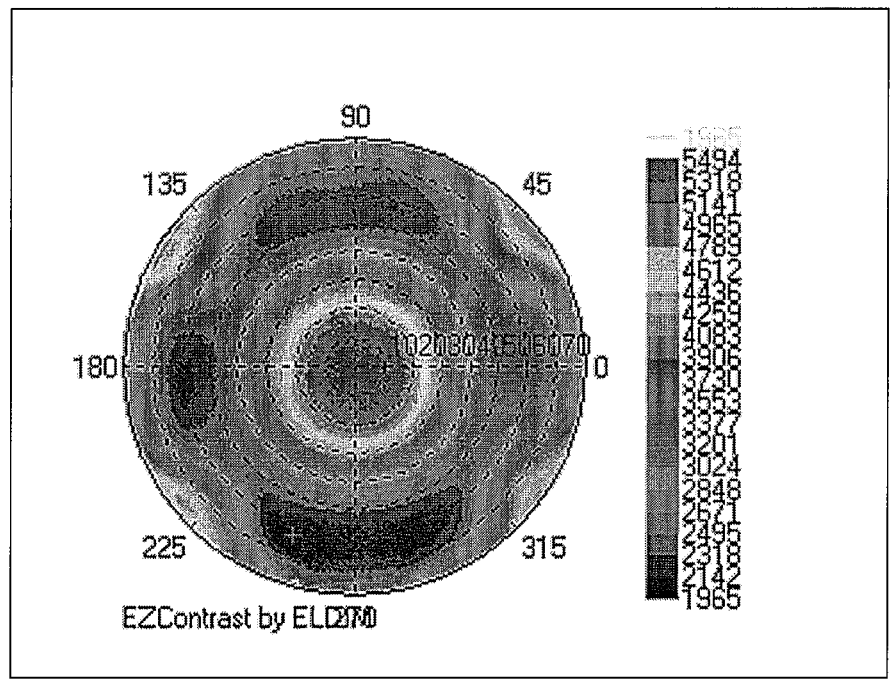
FIG. 8 is an intensity diagram of the composite lens structure of the invention under ELDIM test.
Figure 9:
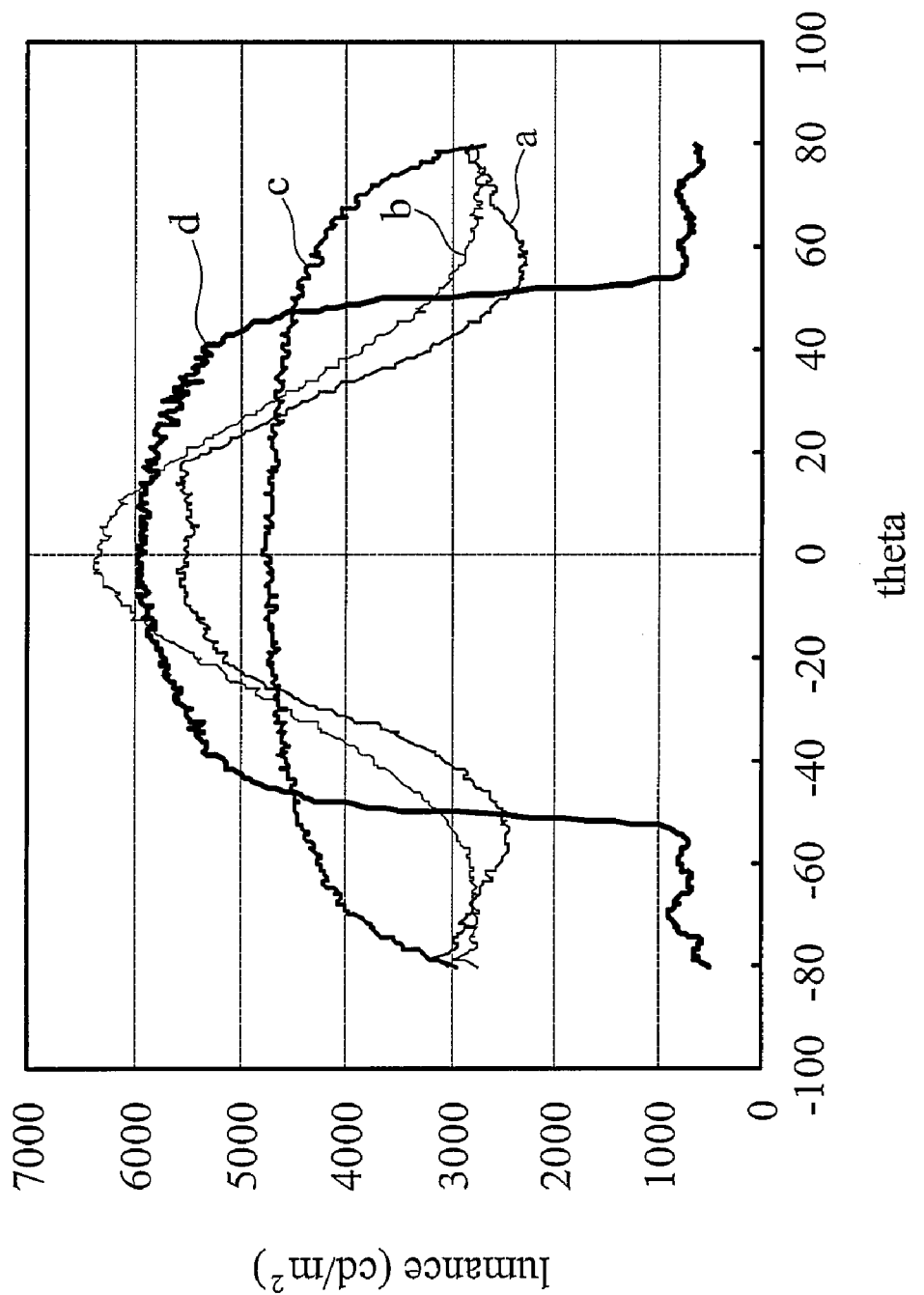
FIG. 9 is an intensity diagram of the composite lens structure of the invention and a conventional diffusion plate and a conventional rhombus lens structure.

Referring to FIGS. 4 and 5, there are three different depths of the composite lens structure. The highest and lowest portion has a smaller curvature radius, and the middle portion has a larger curvature radius. FIG. 6 shows the three different depths, the number represents depth (μm). Referring to FIG. 6, in the convex high curvature portion 662, the depth is 0. In the concave high curvature portion 682, the depth is 51, in the first low curvature portion 666, 30, in the second low curvature 668, 26. FIG. 7 is an intensity diagram of a conventional composite lens structure under ELDIM test. Referring to FIG. 7, the highest light intensity is 4870 nits. FIG. 8 is an intensity diagram of the composite lens structure of the invention under ELDIM test. Referring to FIG. 8, light is condensed in the center and non-symmetrically diffused in the sides. The highest light intensity is 5494 nits. FIG. 9 shows the intensity diagram of the composite lens structure and other conventional optical structures, wherein a represents the composite lens structure of the invention, b represents the composite lens structure of the invention with a diffusion plate, c represents a conventional diffusion plate, and d represents a conventional rhombus lens structure. Referring to FIG. 9, the composite lens structure of the invention has a superior effect of brightness enhancement than the conventional rhombus lens structure. In the high view angle region, the intensity is maintained at 3000 nits, whereas the conventional rhombus lens structure is reduced to below 1000 nits.

Figure 10:
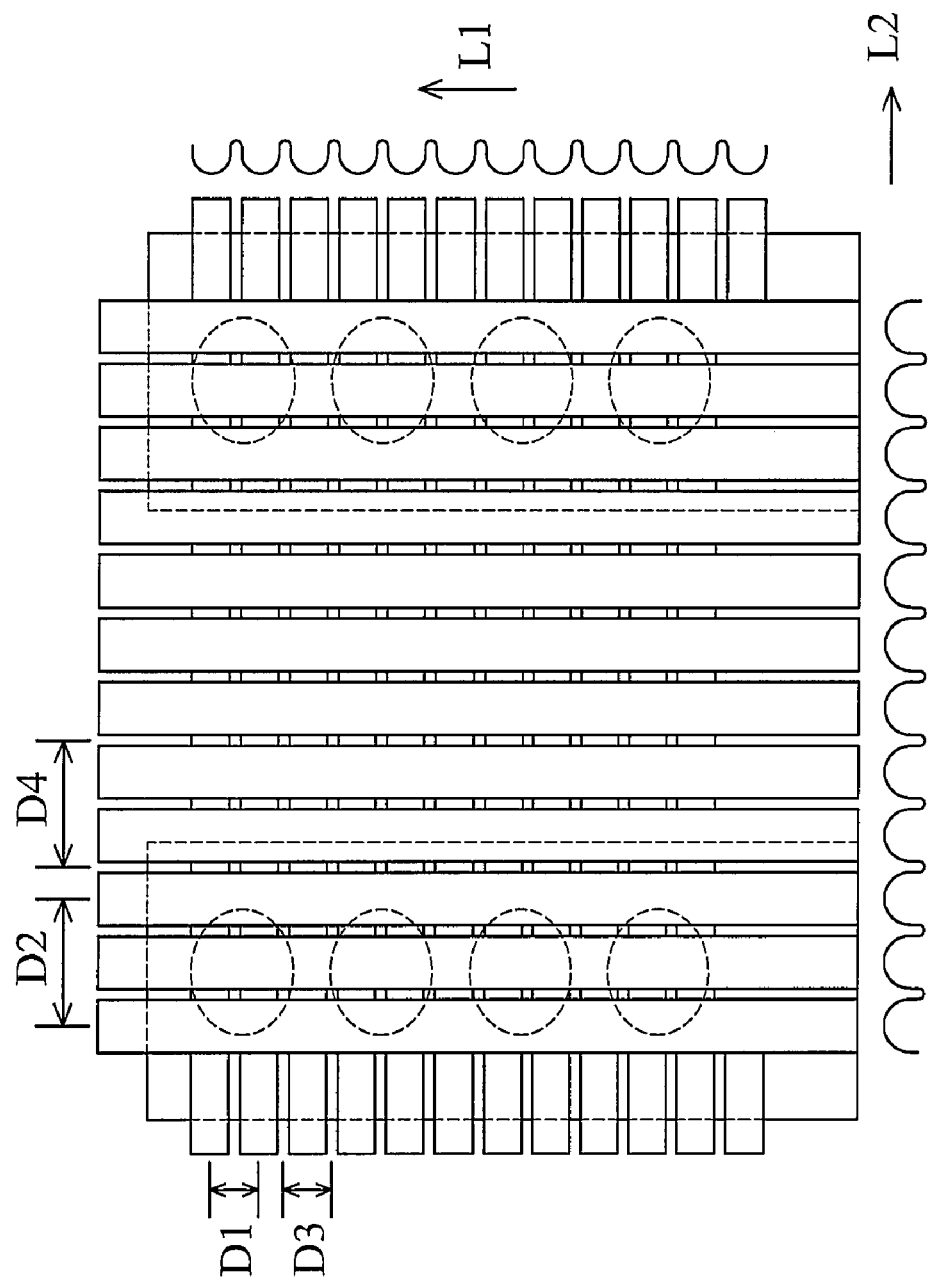
FIG. 10 is an intensity diagram of an embodiment of the composite lens structure of the invention.

FIG. 10 is an intensity diagram for another embodiment of the composite lens structure of the invention. Referring to FIG. 10, the stripes in FIG. 10 represent bright regions where light is condensed. Distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are the same. Distances D4 between any two adjacent concave portions 680 along the second direction L2 are the same.

Figure 11:
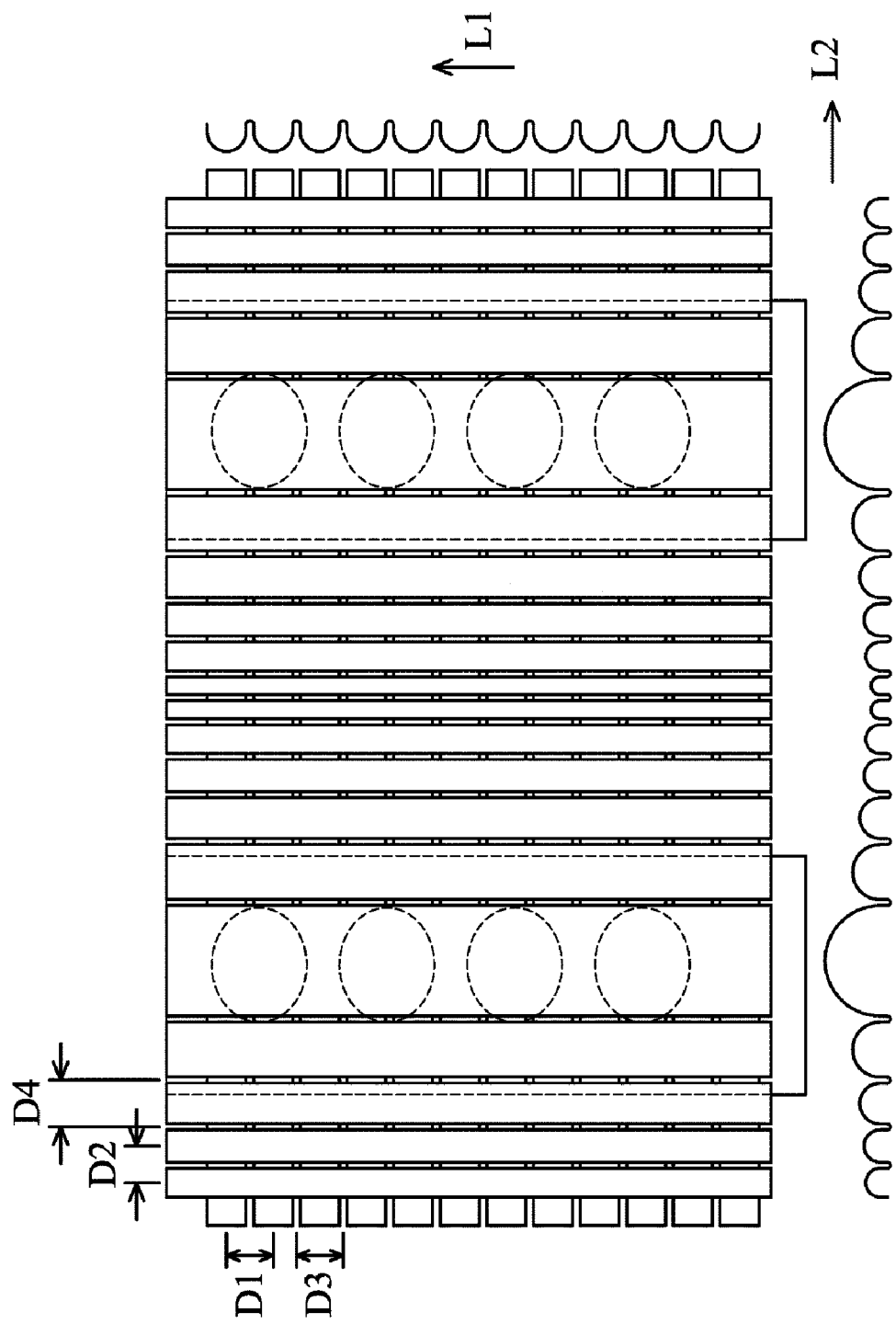
FIG. 11 is an intensity diagram of another embodiment of the composite lens structure of the invention.

FIG. 11 is an intensity diagram for another embodiment of the composite lens structure of the invention. Referring to FIG. 11, distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are different. Distances D4 between any two adjacent concave portions 680 along the second direction L2 are different. D2 and D4 increase gradually from a center of the optical structure 640 to lateral sides thereof.

Figure 12:
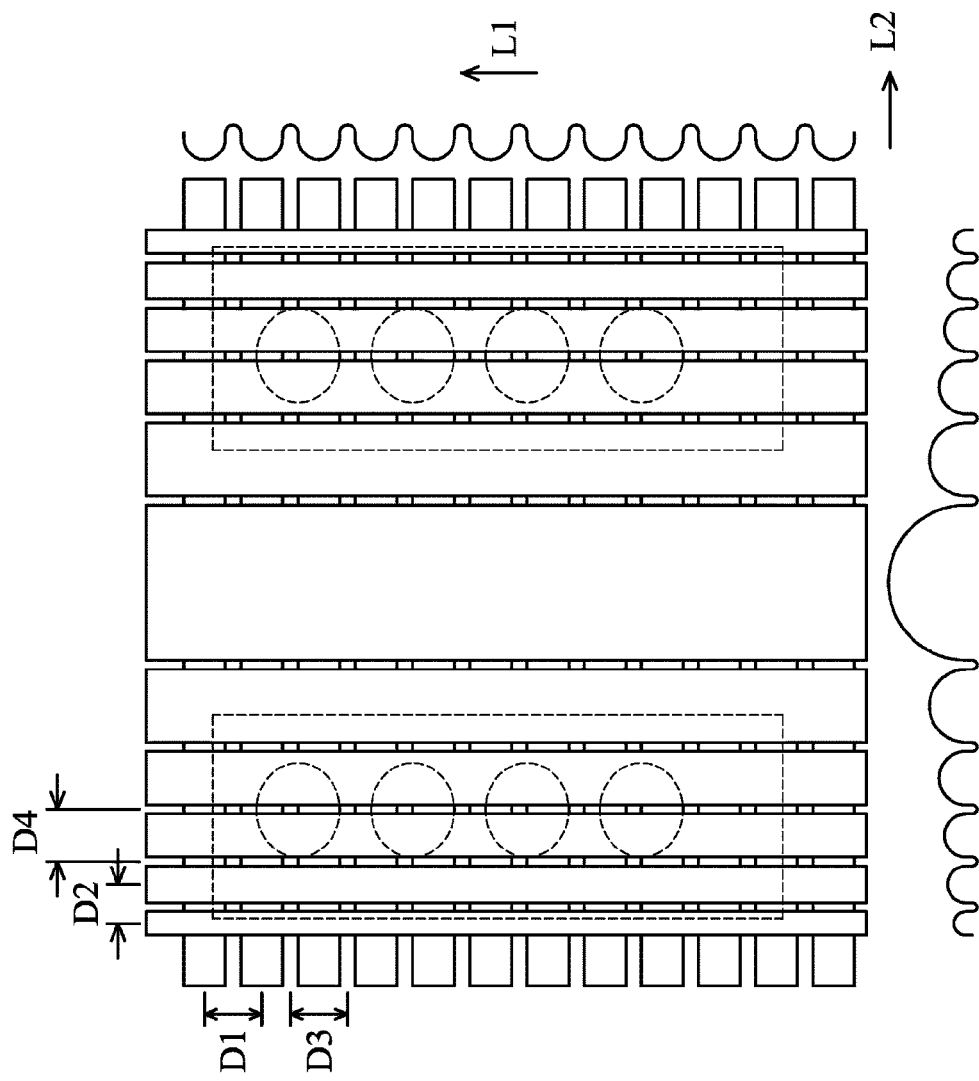
FIG. 12 is an intensity diagram of another embodiment of the composite lens structure of the invention.

FIG. 12 is an intensity diagram for another embodiment of the composite lens structure of the invention. Referring to FIG. 12, distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are different. Distances D4 between any two adjacent concave portions 680 along the second direction L2 are different. D2 and D4 decrease gradually from a center to lateral sides of the optical structure 640.

Figure 13:
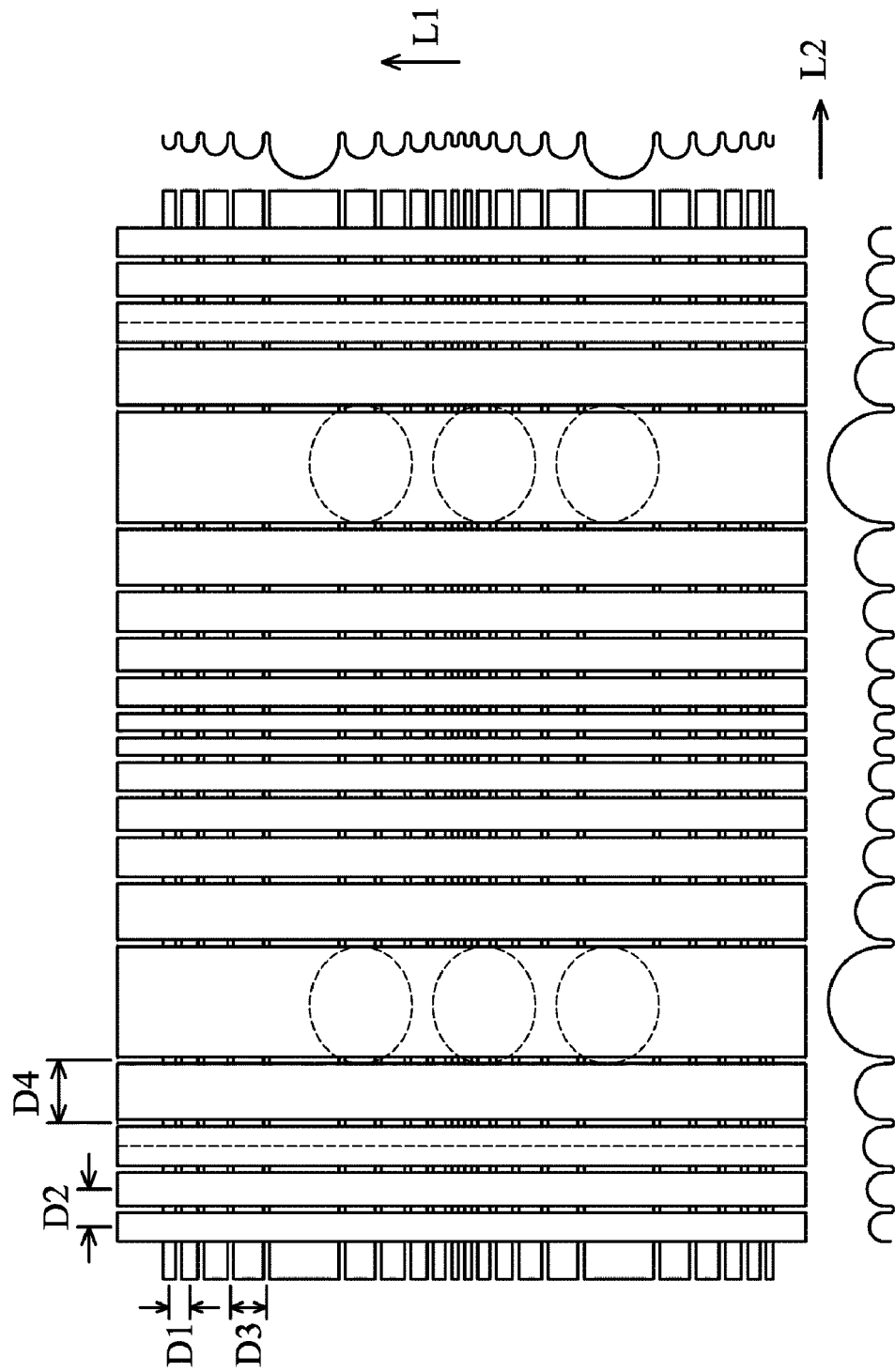
FIG. 13 is an intensity diagram of another embodiment of the composite lens structure of the invention.

FIG. 13 is an intensity diagram for another embodiment of the composite lens structure of the invention. Referring to FIG. 13, distances D1 between any two adjacent convex portions 660 along the first direction L1 are different. Distances D3 between any two adjacent concave portions 680 along the first direction L1 are different. D1 and D3 increase gradually from a center to lateral sides of the optical structure 640. Distances D2 between any two adjacent convex portions 660 along the second direction L2 are different. Distances D4 between any two adjacent concave portions 680 along the second direction L2 are different. D2 and D4 increase gradually from a center to lateral sides of the optical structure 640.

The embodiments above are examples for description, but the invention is not limited thereto. For example, distances D1 between two adjacent convex portions 660 are different along the first direction L1, but distances D3 between any two adjacent concave portions 680 along the first direction L1 are the same.

In addition, although the first direction L1 and the second direction L2 in the described embodiments are perpendicular, the first direction L1 and the second direction L2 can also be other than perpendicular.

Figure 14:
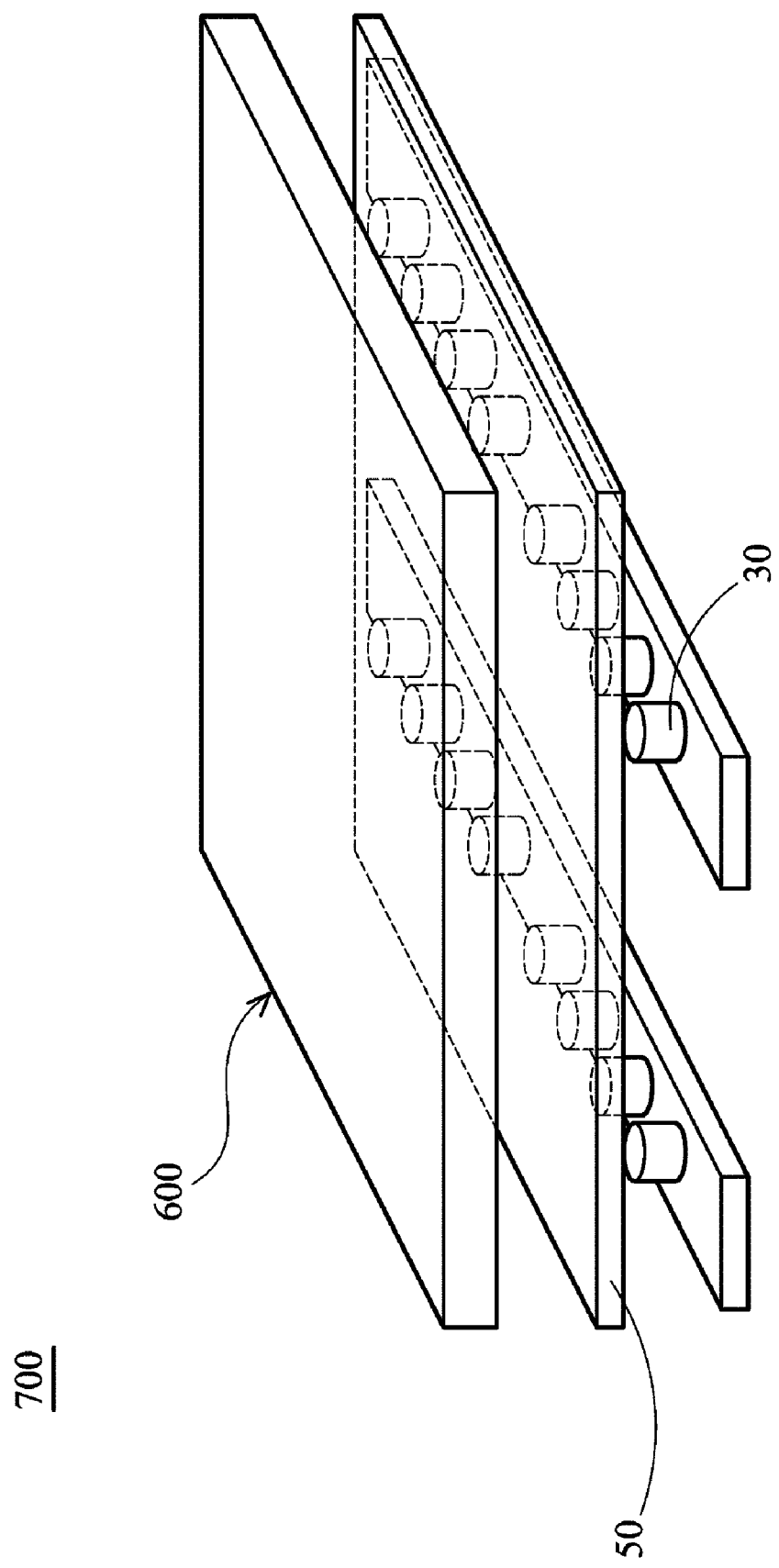
FIG. 14 depicts the composite lens structure of the invention used with a diffusion sheet.
Figure 15:
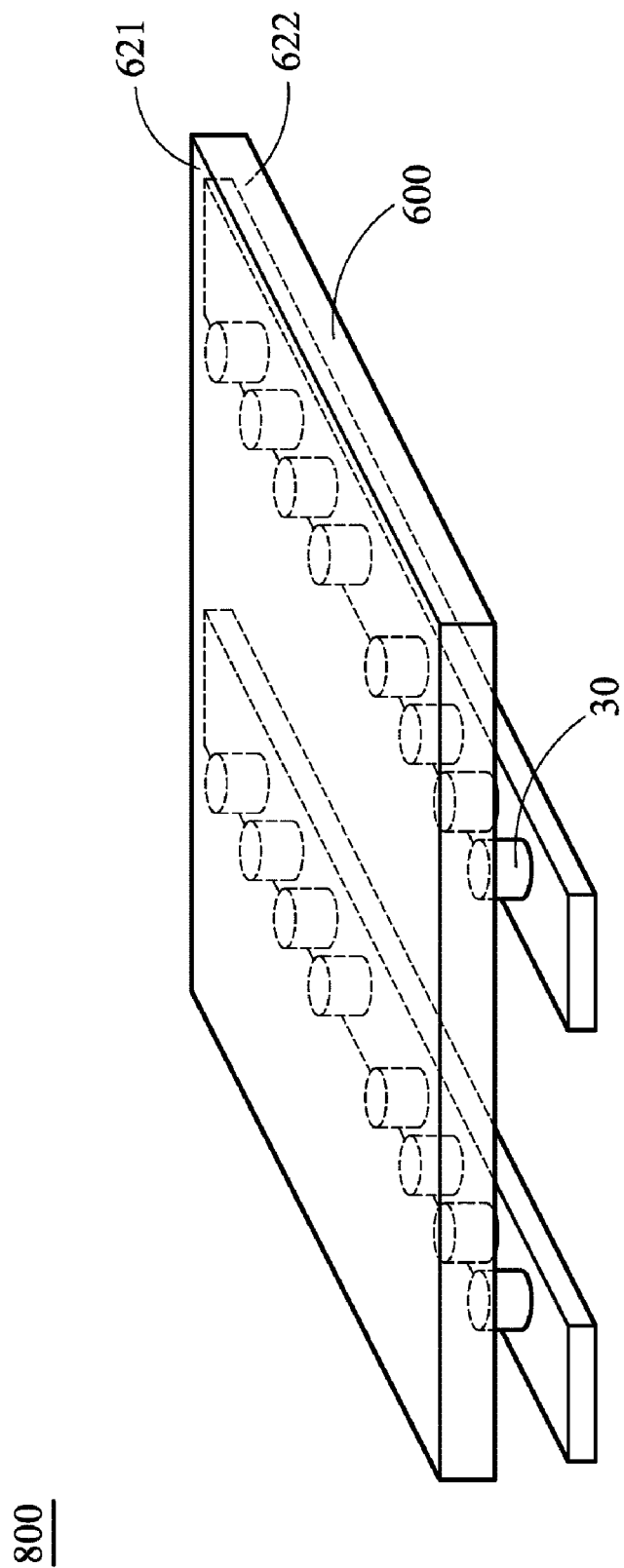
FIG. 15 depicts the composite lens structure of the invention used with a grained structure.
Figure 16:
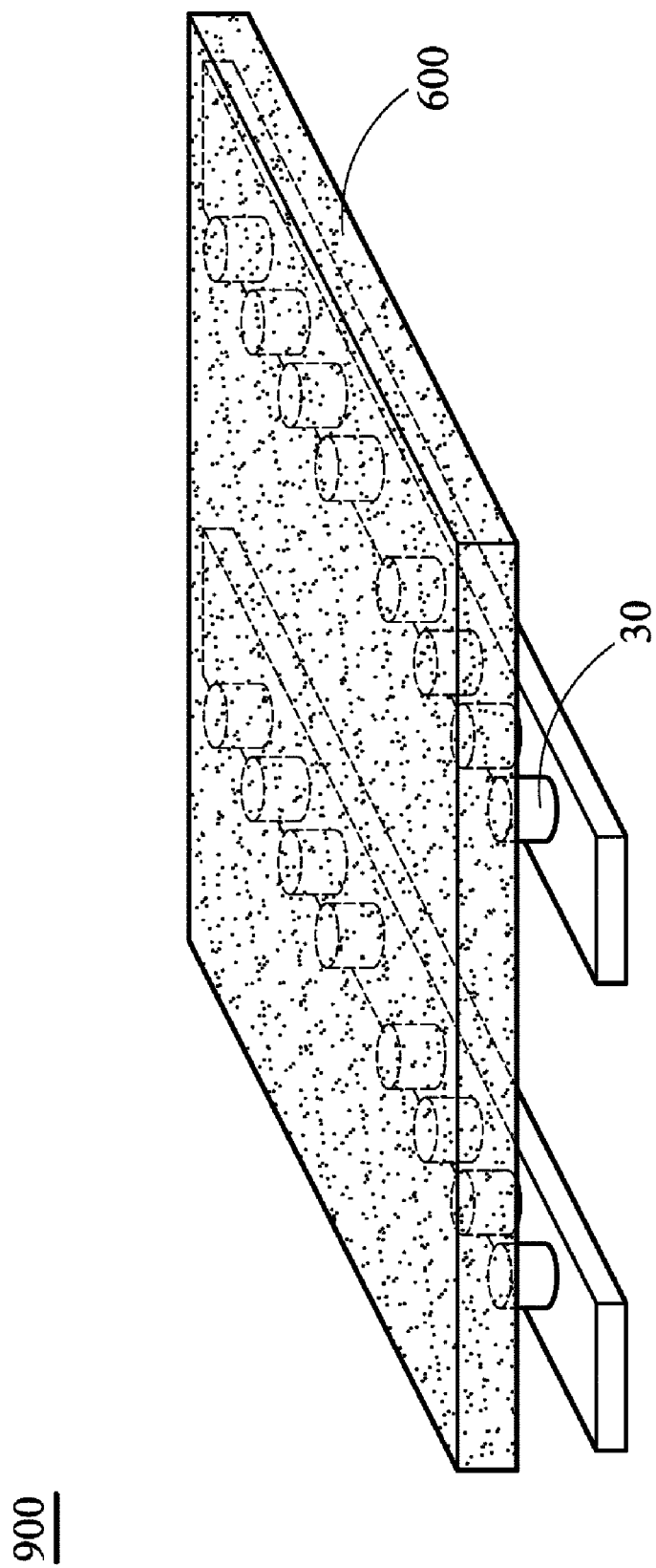
FIG. 16 depicts the composite lens structure of the invention manufactured by a polymer with optical diffusion effect.

The composite lens structure 600 can be combined with a typical diffusion plate 50 to constitute an optical diffusion module 700 as shown in FIG. 14. Number 30 is a LED array. Referring to FIG. 15, an optical diffusion module 800 comprises a grained structure or a blurred structure formed on the bottom (second surface) 622 of the composite lens structure 600 (the optical structure 640 is formed on the first surface 621) to enhance light diffusion. Referring to FIG. 16, an optical diffusion module 900 comprises the composite lens structure 600 of a polymer with light diffusion characteristics.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A composite lens structure, comprising:
   a diffusion plate having a first surface;
   an optical structure formed on the first surface, comprising:
      a plurality of convex portions arranged in a two dimensional array along a first direction and a second direction, each convex portion comprising a convex low curvature portion and a convex high curvature portion protruding from the convex low curvature portion, the curvature radius of the convex high curvature portion is less than that of the convex low curvature portion; and
      a plurality of concave portions arranged in a two dimensional array along a first direction and a second direction, each concave portion comprising a concave low curvature portion and a concave high curvature portion depressed from the concave low curvature portion, the curvature radius of the concave high curvature portion is less than that of the concave low curvature portion, wherein each convex portion is adjacent to a plurality of concave portions and each concave portion is adjacent to a plurality of convex portions, and the convex portions, the concave portions and each junction of the convex and concave portions have a curvature different from 0.

2. The composite lens structure as claimed in claim 1, wherein the convex low curvature portion comprises a first low curvature portion along the first direction and a second low curvature portion along the second direction, and the first low curvature portion and the second low curvature portion are connected to the convex high curvature portion.

3. The composite lens structure as claimed in claim 2, wherein the first low curvature portion and the second low curvature portion have the same curvature.

4. The composite lens structure as claimed in claim 2, wherein the first low curvature portion has a curvature different from that of the second low curvature portion.

5. The composite lens structure as claimed in claim 2, wherein the concave low curvature portion comprises a third low curvature portion along the first direction and a fourth low curvature portion along the second direction, and the third low curvature portion and the fourth low curvature portion are connected to the concave high curvature portion.

6. The composite lens structure as claimed in claim 5, wherein the first low curvature portion is adjacent to the fourth low curvature portion, and the second low curvature portion is adjacent to the third low curvature portion.

7. The composite lens structure as claimed in claim 1, wherein the concave low curvature portion comprises a third low curvature portion along the first direction and a fourth low curvature portion along the second direction, and the third low curvature portion and the fourth low curvature portion are connected to the concave high curvature portion.

8. The composite lens structure as claimed in claim 7, wherein the third low curvature portion and the fourth low curvature portion have the same curvature.

9. The composite lens structure as claimed in claim 7, wherein the third low curvature portion has a curvature different from that of the fourth low curvature portion.

10. The composite lens structure as claimed in claim 1, wherein distances from one convex portion to other convex portions, which are adjacent to the one convex portion, are the same along the first direction.

11. The composite lens structure as claimed in claim 10, wherein distances from one convex portion to other convex portions, which are adjacent to the one convex portion, are the same along the second direction.

12. The composite lens structure as claimed in claim 11, wherein distances from one concave portion to other concave portions, which are adjacent to the one concave portion, are the same along the first direction.

13. The composite lens structure as claimed in claim 12, wherein distances from one concave portion to other concave portions, which are adjacent to the one concave portion, are the same along the second direction.

14. The composite lens structure as claimed in claim 10, wherein distances from one convex portion to other convex portions, which are adjacent to the one convex portion, are different along the second direction.

15. The composite lens structure as claimed in claim 14, wherein the distance from one convex portion to another convex portion, which is adjacent to the one convex portion, decreases from a center to lateral sides of the composite lens structure along the second direction.

16. The composite lens structure as claimed in claim 14, wherein the distance from one convex portion to another convex portion, which is adjacent to the one convex portion, increases from a center to lateral sides of the composite lens structure along the second direction.

17. The composite lens structure as claimed in claim 14, wherein distances from one concave portion to other concave portions, which are adjacent to the one concave portion, are the same along the first direction.

18. The composite lens structure as claimed in claim 17, wherein distances from one concave portion to other concave portions, which are adjacent to the one concave portion, are different along the second direction.

19. The composite lens structure as claimed in claim 18, wherein the distance from one concave portion to another concave portion, which is adjacent to the one concave portion, decreases from a center to lateral sides of the composite lens structure along the second direction.

20. The composite lens structure as claimed in claim 18, wherein the distance from one concave portion to another concave portion, which is adjacent to the one concave portion, increases from a center to lateral sides of the composite lens structure along the second direction.

21. The composite lens structure as claimed in claim 14, wherein the distance from one convex portion to another convex portion, which is adjacent to the one convex portion, decreases from a center to lateral sides of the composite lens structure along the first direction.

22. The composite lens structure as claimed in claim 21, wherein the distance from one convex portion to another convex portion, which is adjacent to the one convex portion, decreases from a center to lateral sides of the composite lens structure along the second direction.

23. The composite lens structure as claimed in claim 21, wherein the distance from one convex portion to another convex portion, which is adjacent to the one convex portion, increases from a center to lateral sides of the composite lens structure along the second direction.

24. The composite lens structure as claimed in claim 1, wherein distances from one convex portion to other convex portions, which are adjacent to the one convex portion, are different along the first direction.

25. The composite lens structure as claimed in claim 24, wherein distances from one convex portion to other convex portions, which are adjacent to the one convex portion, are different along the second direction.

26. The composite lens structure as claimed in claim 25, wherein the distance from one convex portion to another convex portion, which is adjacent to the one convex portion, increases from a center to lateral sides of the composite lens structure along the first direction.

27. The optical diffusion module as claimed in claim 26, wherein the distance from one convex portion to another convex portion, which is adjacent to the one convex portion, increases from a center to lateral sides of the composite lens structure along the second direction.

28. The optical diffusion module as claimed in claim 24, wherein distances from one concave portion to other concave portions, which are adjacent to the one concave portion, are different along the first direction.

29. The optical diffusion module as claimed in claim 28, wherein distances from one concave portion to other concave portions, which are adjacent to the one concave portion, are different along the second direction.

30. The optical diffusion module as claimed in claim 1 further comprising a diffusion layer, wherein light from a light source passes through the diffusion layer and the diffusion plate sequentially.

31. The optical diffusion module as claimed in claim 1, wherein the diffusion plate further has a second surface on which a grained structure is formed, and light from a light source passes through the second surface and the first surface sequentially.

32. The optical diffusion module as claimed in claim 1, wherein the diffusion plate further has a second surface on which a blurred structure is formed, and light from a light source passes through the second surface and the first surface sequentially.

33. The optical diffusion module as claimed in claim 1, wherein the diffusion plate is made of polymer with optical diffusion effect.

34. A method of forming a composite lens structure, comprising:
   providing a substrate;
   providing a first mask having a plurality of first holes arranged in a array;
   providing a second mask having a plurality of second holes arranged in an array;
   providing an first energy beam;
   placing the first and second masks between the first energy beam and the substrate;
   moving the first mask or the substrate along a first direction;
   moving the second mask or the substrate along a second direction to form a two dimensional array of convex portions and concave portions on the substrate;
   providing a second energy beam;
   placing the first and second masks between the second energy beam and the substrate;
   moving the first mask or the substrate along a first direction;
   moving the second mask or the substrate along a second direction to form a convex high curvature portion and a convex low curvature portion adjacent to the convex high curvature portion on the convex portion, and to form a concave high curvature portion and a concave low curvature portion adjacent to the concave high curvature portion on the concave portion.

35. The method as claimed in claim 34, wherein the first direction is perpendicular to the second direction.

36. The method as claimed in claim 34, wherein distances between one first hole to other first holes, which are adjacent to the one first hole, are the same.

37. The method as claimed in claim 36, wherein distances between one second hole to other second holes, which are adjacent to the one second hole, are the same.

38. The method as claimed in claim 36, wherein distances between one second hole to other second holes, which are adjacent to the one second hole, are different.

39. The method as claimed in claim 34, wherein distances between one first hole to other first holes, which are adjacent to the one first hole, are different, and distances between one second hole to other second holes, which are adjacent to the one second hole, are different.

40. The method as claimed in claim 34, wherein the second energy beam has a higher intensity than the first energy beam.

41. A method of forming a composite lens structure, comprising:
   providing a substrate;
   providing a mask having a plurality of holes arranged in an array;
   providing a first energy beam;
   providing a second energy beam;
   placing the mask between the first energy beam and the substrate;
   moving the mask or the substrate along a first direction; and
   moving the mask or the substrate along a second direction to form a two dimensional array of convex portions and concave portions on the substrate, wherein each convex portion is adjacent to a plurality of concave portions and each concave portion is adjacent to a plurality of convex portions;
   placing the mask between the second energy beam and the substrate;
   moving the mask or the substrate along a first direction; and
   moving the mask or the substrate along a second direction to form convex high curvature portion and a convex low curvature portion adjacent to the convex high curvature portion on the convex portion, and to form a concave high curvature portion and a concave low curvature portion adjacent to the concave high curvature portion on the concave portion.

42. The method as claimed in claim 41, wherein the first direction is perpendicular to the second direction.

43. The method as claimed in claim 41, wherein the second energy beam has a higher intensity than the first energy beam.

* * * * *